(12) United States Patent
Sambhy et al.

(10) Patent No.: US 8,931,885 B1
(45) Date of Patent: Jan. 13, 2015

(54) ANTI-WETTING COATING COMPOSITION

(71) Applicant: Xerox Corporation, Norwalk, CT (US)

(72) Inventors: Varun Sambhy, Penfield, NY (US); Santokh S. Badesha, Pittsford, NY (US); Michael S. Roetker, Webster, NY (US); Jonathan H. Herko, Walworth, NY (US); Kyle B. Tallman, Perry, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/013,273

(22) Filed: Aug. 29, 2013

(51) Int. Cl.
 *B41J 2/135* (2006.01)
 *C09D 175/08* (2006.01)

(52) U.S. Cl.
 CPC .............. *C09D 175/08* (2013.01); *B41J 2/135* (2013.01)
 USPC ............................................ 347/45; 347/20

(58) Field of Classification Search
 USPC ................................. 347/20, 45, 47
 See application file for complete search history.

(56) References Cited

U.S. PATENT DOCUMENTS

| 6,001,923 | A | * | 12/1999 | Moncur et al. | 524/590 |
| 8,544,987 | B2 | | 10/2013 | Sambhy et al. | |
| 2011/0097571 | A1 | * | 4/2011 | Tee et al. | 428/315.9 |
| 2012/0044298 | A1 | | 2/2012 | Sambhy et al. | |
| 2012/0268524 | A1 | | 10/2012 | Zhao et al. | |
| 2012/0270344 | A1 | | 10/2012 | Zhao et al. | |
| 2013/0044162 | A1 | | 2/2013 | Zhao et al. | |
| 2013/0096254 | A1 | | 4/2013 | Sambhy et al. | |

OTHER PUBLICATIONS

Law et al., "Thermal Bubble Jetting Mechanism, Method of Jetting and Method of Making the Mechanism", U.S. Appl. No. 13/555,901, filed Jul. 23, 2012.
Liu et al., "Bias Charge Roller and Apparatus Incorporating the Bias Charge Roller", U.S. Appl. No. 13/566,541, filed Aug. 3, 2012.
Sambhy et al., "Process for Thermally Stable Oleophobic Low Adhesion Coating for Inkjet Printhead Front Face", U.S. Appl. No. 13/451,391, filed Apr. 19, 2012.
Author Unknown, Material Safety Data Sheet, Sigma-Aldrich, May 29, 2013, pp. 1-6.
Author Unknown, Poly[4,5-difluoro-2,2-bis(trifluoromethyl)-1,3-dioxole-co-tetrafluoroethylene], Sigma-Aldrich, http://www.sigmaaldrich.com/catalog/product/aldrich/469629?lang=en&region=US, accessed May 29, 2013, pp. 1-2.

* cited by examiner

*Primary Examiner* — Juanita D Jackson
(74) *Attorney, Agent, or Firm* — MH2 Technology Law Group LLP

(57) ABSTRACT

A composition is made from ingredients comprising a fluorinated polyurethane and a copolymer of (i) a fluoroalkylene monomer unit and (ii) a dioxole monomer unit substituted with at least one substituent selected from the group consisting of a fluorine atom and a fluoroalkyl. The fluorinated polyurethane is a product of an isocyanate and a hydroxyl functionalized fluorinated polyether. The composition can be employed for making anti-wetting coatings used, for example, in printhead devices.

20 Claims, 2 Drawing Sheets

ANTI-WETTING COATING COMPOSITION

FIELD OF THE DISCLOSURE

The present disclosure is directed to a polymer composition that can be used to form anti-wetting coatings.

BACKGROUND

In many solid ink printheads, the aperture plate and jet stacks typically consist of stainless steel plates. The aperture plate has an array of small holes, or nozzles, also sometimes referred to as jets, through which the ink exits the jet stack. Stainless steel aperture plates and other plates in the jet stack are being replaced with flexible, polymer layers such as polyimide. In some instances, the polyimide film receives an anti-wetting coating, is bonded to a stainless steel aperture plate, and then a laser ablates the array of apertures into the polyimide film.

Drooling apertures, wetting and adhesion of ink on the printhead front face lead to missing and/or misdirectional jetting along with poor image quality ("IQ"). Drooling apertures weep ink when the internal pressure of the printhead exceeds a particular pressure, typically measured in inches of water. The higher pressure the apertures can maintain without weeping leads to higher jetting latitude and improved performance. Wetting occurs when the front face of the printhead remains wet after printing. Ink that remains on the printhead can block the apertures resulting in missing apertures and misdirectional printing.

Currently, one approach to overcome these issues is to use an active cleaning blade system. The system purges ink from the printhead. Ink purges typically occur after the system detects missing jets and after a power-down when the ink has frozen or solidified, shrunk and drawn air into the system. The ink purge expels contamination, trapped air and clears the apertures, and then the wipers wipe off the front face. With an expected printhead lifetime of 6 years, daily purges can result in roughly 2000 purge and wipe cycles, meaning that in some instances, anti-wetting coating may have to survive and maintain their beneficial properties for over 2000 cycles.

It is desirable for anti-wetting coatings to have high contact angle in order to maintain adequate drool pressure and low slide angle and to maintain an easy clean/self clean feature. This can lead to printhead cartridges with low or no maintenance, high engine reliability and low run cost. It is desirable for anti-wetting coatings to retain these properties after high temperature and pressure conditions that may occur during manufacturing of, for example, a printhead. Unfortunately, some conventional anti-wetting coatings may tend to degrade when exposed to temperatures encountered during typical bonding processes or other high-temperature, high pressure processes encountered during fabrication of inkjet printheads. Further, coatings that do have good thermal and/or ink stabilities may suffer from lower mechanical robustness than may be desirable.

Yet another issue that may arise with anti-wetting coatings is the appearance of a thin layer of oil on the coating surface after high temperature curing processes. While the oil does not seem to directly affect the surface properties and printhead performance, it may cause shelf life issues and problems in packaging and handling. The oil layer can be cleaned from the surface, but this would increase manufacturing complexity and costs.

Novel anti-wetting coatings that can address one or more of the above described problems would be considered an advancement in the art.

SUMMARY

An embodiment of the present disclosure is directed to a composition. The composition is made from ingredients comprising a fluorinated polyurethane and a copolymer of (i) a fluoroalkylene monomer unit and (ii) a dioxole monomer unit substituted with at least one substituent selected from the group consisting of a fluorine atom and a fluoroalkyl. The fluorinated polyurethane is a product of an isocyanate and a hydroxyl functionalized fluorinated polyether.

Another embodiment of the present disclosure is directed to a process. The process comprises mixing ingredients to form a composition, the ingredients comprising (a) a fluorinated polyurethane, the fluorinated polyurethane being a product of an isocyanate and a hydroxyl functionalized fluorinated polyether, (b) a copolymer of a fluoroalkylene monomer unit and dioxole monomer unit, the dioxole monomer unit being substituted with at least one of a fluorine atom or a fluoroalkyl, and (c) a solvent. The composition is deposited on a substrate to form a layer. The layer is heated to form the anti-wetting coating.

Still another embodiment of the present disclosure is directed to a printhead. The printhead comprises a jetstack. An aperture plate is positioned on the jetstack. An anti-wetting coating is positioned over the aperture plate. The anti-wetting coating comprises a reacted blend of (a) a fluorinated polyurethane, the fluorinated polyurethane being a product of an isocyanate and a hydroxyl functionalized fluorinated polyether, and (b) a copolymer of fluoroalkylene monomer units and fluorine-group-substituted dioxole units. The anti-wetting coating has a surface capable of maintaining a contact angle of greater than about 40° with a drop of solid ink after the coating has been exposed to a temperature of 290° C. and a pressure of 350 psi for 30 minutes It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
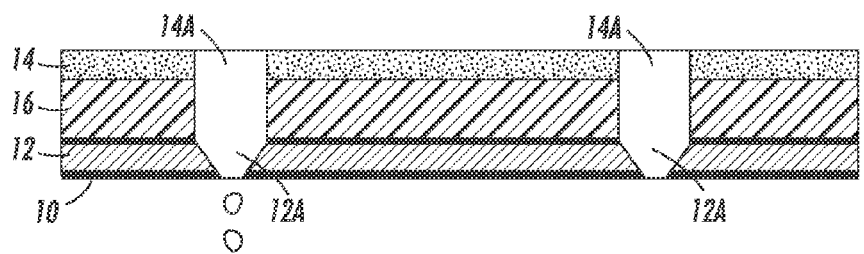
FIG. 1 illustrates an embodiment of a portion of a printhead jet stack having an anti-wetting coating, according to an embodiment of the present disclosure.
Figure 2:
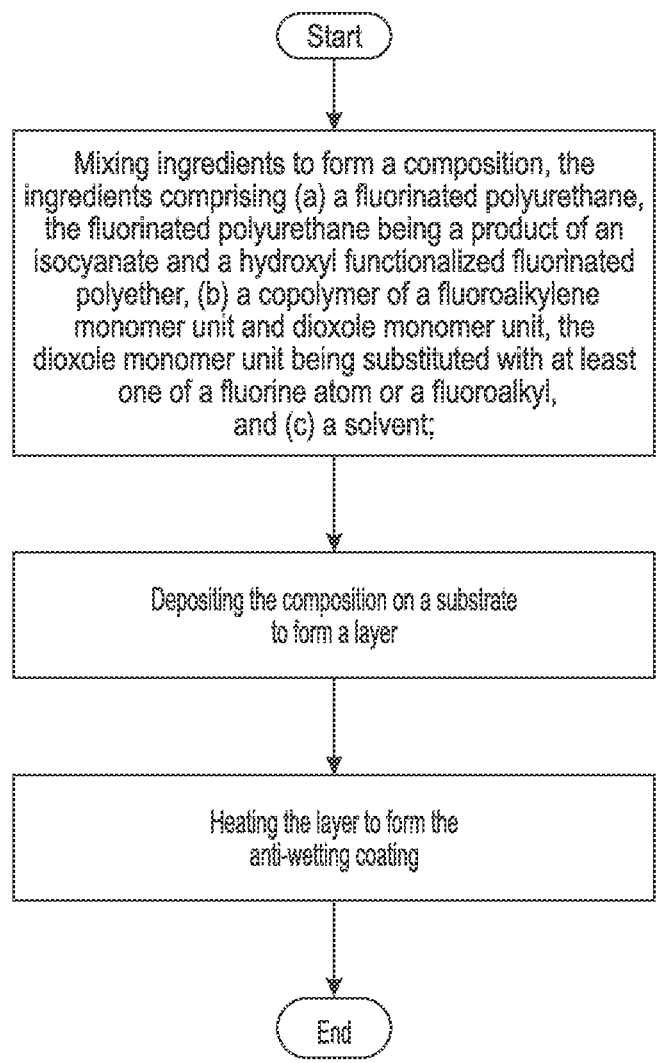
FIG. 2 shows a process for making a composition, according to an example of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

Anti-Wetting Composition

An embodiment of the present disclosure is directed to an anti-wetting composition. The composition is made from ingredients comprising a fluorinated polyurethane and a copolymer of (i) a fluoroalkylene monomer unit and (ii) a dioxole monomer unit substituted with at least one substituent selected from the group consisting of a fluorine atom and a fluoroalkyl. The fluorinated polyurethane is a product of an isocyanate and a hydroxyl functionalized fluorinated polyether.

The fluorinated polyurethanes can be a reaction product of a mixture that includes an isocyanate and a hydroxy functionalized fluorinated polyether. In an embodiment, the polyether is a hydroxy functionalized fluorinated polyoxyalkane.

Suitable isocyanates include monomeric, oligomeric, and polymeric isocyanates, including, but not limited to, those of the general formula:

wherein $R_1$ is an alkyl group, an alkylene group, an aryl group, an arylene group, an arylalkyl group, an arylalkylene group, an alkylaryl group or an alkylarylene group; and n is an integer representing the number of isocyanate groups, being, for example, 1, 2, 3 or the like in the instance of monomeric isocyanates and having no necessary upper limit in the case of polymeric isocyanates.

In one embodiment, $R_1$ is an alkyl or an alkylene group. Examples of such groups include linear and branched, saturated and unsaturated, cyclic and acyclic, and substituted and unsubstituted alkyl and alkylene groups. Heteroatoms, such as oxygen, nitrogen, sulfur, silicon, phosphorus, or the like either may or may not be present in the alkyl or alkylene group. In one embodiment, the alkyl or alkylene group has at least about 8 carbon atoms. In another embodiment, the alkyl or alkylene group has at least about 10 carbon atoms. In another embodiment, the alkyl or alkylene group has at least about 12 carbon atoms. In one embodiment, the alkyl or alkylene group has no more than about 60 carbon atoms. In another embodiment, the alkyl or alkylene group has no more than about 50 carbon atoms. In yet another embodiment, the alkyl or alkylene group has no more than about 40 carbon atoms. It will be appreciated, however, that the number of carbon atoms can be outside of these ranges.

In one embodiment, $R_1$ is an aryl or an arylene group. Examples of such groups include substituted and unsubstituted aryl and arylene groups. Heteroatoms, such as oxygen, nitrogen, sulfur, silicon, phosphorus, or the like either may or may not be present in the aryl or arylene group. In one embodiment, the aryl or arylene group has at least about 5 carbon atoms. In another embodiment, the aryl or arylene group has at least about 6 carbon atoms. In one embodiment, the aryl or arylene group has no more than about 50 carbon atoms. In another embodiment, the aryl or arylene group has no more than about 25 carbon atoms. In yet another embodiment, the aryl or arylene group has no more than about 12 carbon atoms. It will be appreciated, however, that the number of carbon atoms can be outside of these ranges.

In one embodiment, $R_1$ is an arylalkyl or an arylalkylene group. Examples of such groups include substituted and unsubstituted arylalkyl and arylalkylene groups, wherein the alkyl portion of the arylalkyl or arylalkylene group can be linear or branched, saturated or unsaturated, cyclic or acyclic, and substituted or unsubstituted, and wherein heteroatoms, such as oxygen, nitrogen, sulfur, silicon, phosphorus, or the like either may or may not be present in either the aryl or the alkyl portion of the arylalkyl or arylalkylene group. In one embodiment, the arylalkyl or arylalkylene group has at least about 6 carbon atoms. In another embodiment, the arylalkyl or arylalkylene group has at least about 7 carbon atoms. In one embodiment, the arylalkyl or arylalkylene group has no more than about 60 carbon atoms. In another embodiment, the arylalkyl or arylalkylene group has no more than about 40 carbon atoms. In yet another embodiment, the arylalkyl or arylalkylene group has no more than about 30 carbon atoms. It will be appreciated, however, that the number of carbon atoms can be outside of these ranges.

The substituents on the substituted alkyl, alkylene, aryl, arylene, arylalkyl, arylalkylene, alkylaryl, and alkylarylene groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, mixtures thereof, or the like, wherein two or more substituents can be joined together to form a ring.

Examples of diisocyanates include isophorone diisocyanate (IPDI), of the formula:

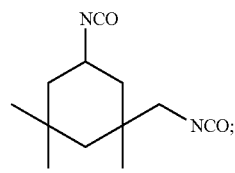

2,4-toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), of the formula:

OCN—(CH$_2$)$_6$—NCO;

naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; 2,2,4-trimethylhexamethylene diisocyanate and 2,4,4-trimethylhexamethylene diisocyanate, of the formulae:

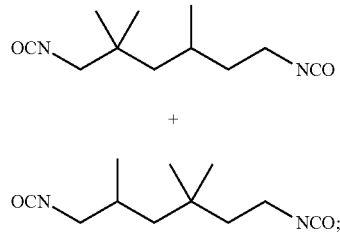

tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; or the like, as well as mixtures thereof. Examples of triisocyanates or their equivalents include triphenyl methane-4,4',4"-triisocyanate; Tris(p-isocynatophenyl)thiophosphate; trimethylolpropane trimer of TDI, or the like, isocyanurate trimers of TDI, HDI, IPDI, or the like, and biuret trimers of TDI, HDI, IPDI, or the like, as well as mixtures thereof. Examples of higher isocyanate functionalities include copolymers of TDI/HDI, or the like, and MDI oligomers, as well as mixtures thereof. In some embodiments, the isocyanate moiety can be allophanate modified MDI or polymers of allophanate modified MDI. In some embodiments, the isocyanate moiety can also be a (per)fluoropolyethereal prepolymer having polyisocyanic functionality as described in prior art (U.S. Pat. No. 4,863,986; U.S. Pat. No. 4,704,420; U.S. Pat. No. 6,071,564), and previously available commercially as Fluorobase-Z. In some embodiments, suitable isocyanates may be obtained under the name Desmodur® Mondur® or Impranil® for example, Desmodur N 3300®, Desmodur N 3790®, available from Bayer Materials Science, or the like or mixtures thereof.

Suitable hydroxy functionalized fluorinated polyether compounds include mono- or di-hydroxyl functionalized monomeric, oligomeric, and polymeric fluoropolyether compounds. In an embodiment, the polyether is a hydroxy functionalized fluorinated polyoxyalkane. Examples include dihydroxy functionalized fluoropolyether compounds, such as those of the general formula:

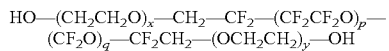

wherein p and q are integers ranging from 0 to about 50, provided that at least one of p and q are not zero, and x and y are integers ranging from 0 to about 10. The ethyloxide spacers may cause the compound to be more highly reactive than previously used compounds. In one embodiment, a suitable di-functionalized fluoropolyether compound can be represented by the formula:

where b and c are defined the same as p and q above.

In some embodiments, suitable dihydroxy functionalized fluoropolyether or perfluoropolyether compounds may be obtained under the name Fluorolink®, for example, Fluorolink D®, Fluorolink D10®, Fluorolink D10H®, Fluorolink E100, Fluorolink E10H®, available from Solvay Solexis, or the like or mixtures thereof. For purposes of the present disclosure, the term fluoropolyether is defined to be a polyether compound having at least some carbon-fluorine bonds. A perfluoropolyether, on the other hand, is defined as a species of fluoropolyether where all of the carbon-hydrogen bonds have been replaced with carbon-fluorine bonds.

As discussed above, the fluorinated polyurethanes are formed by reacting the isocyanate and hydroxy functionalized fluorinated polyether. Any suitable reaction processes can be used, such as, for example, by condensing one or more of the fluoropolyether compounds with one or more of the isocyanates. Such methods are known in the art. The reaction can be carried out at various temperatures, such as, for example, from about 25° C. to about 160° C., in the presence of an optional reaction catalyst, such as dibutyltin dilaurate, bismuth tris-neodecanoate, cobalt benzoate, lithium acetate, stannous octoate, triethylamine, or the like. Other exemplary catalysts include RC catalysts from Rheine Chemie.

In one embodiment, the reaction conditions can be conducted in an inert atmosphere, such as argon or nitrogen gas or other suitable gases, to prevent oxidizing or yellowing of the reaction products and to prevent undesirable side reactions due to moisture. The reaction can be performed neat (i.e., without a solvent) or can optionally employ any desired or effective solvent. Examples of suitable solvents include xylene, toluene, benzene, chlorobenzene, hexafluorobenzene, nitrobenzene, dichlorobenzene, N-methylpyrrolidinone, dimethyl formamide, dimethyl sulfoxide, sulfolane, hexane, tetrahydrofuran, butyl acetate, amyl acetate, HFE 7200 (3M), HFE 7500 (3M), Solvosol (Dow) and the like, as well as mixtures thereof. Another example of a solvent that may be used is FCL 52 solvent, a fluorinated solvent available from Cytonix LLC.

The copolymer employed in the compositions of the present disclosure comprises a fluoroalkylene polymer unit and a dioxole polymer unit. The dioxole unit includes at least one substituent selected from the group consisting of a fluorine atom and a fluoroalkyl group. In an embodiment, the fluoroalkylene unit is derived from a tetrafluoroethylene (TFE) monomer and the dioxole unit is derived from a 2,2-bistrifluoromethyl-4,5-difluoro-1,3-dioxole (BDD) monomer.

The molar ratio of TFE:BDD in the amorphous fluoropolymer coating can range from about 5:95 to about 50:50, or from about 10:90 to about 45:55, or from about 15:85 to about 36:64. Examples of the fluoroalkylene-dioxole include DuPont TEFLON® AF1600 and AF2400. Another example is TECNOFLON, a fluoroelastomer polymer available from Solvay Plastics.

Any suitable solvents can be employed in the compositions of the present disclosure. Examples of suitable solvents include NOVEC 7300, NOVEC 7200 and NOVEC 7500, all available from 3M Company, FLUORINERT FC-75, FLUORINERT FC-72 and FLUORINERT FC-40, all available from 3M, FLUTEC solvents available from Rhone and GLADEN solvent available from Solvay Solexix. Other suitable solvents include xylene, toluene, benzene, chlorobenzene, hexafluorobenzene, nitrobenzene, dichlorobenzene, N-methylpyrrolidinone, dimethyl formamide, dimethyl sulfoxide, sulfolane, hexane, tetrahydrofuran, butyl acetate, ethyl acetate and amyl acetate.

Process of Making the Anti-Wetting Coating

The present disclosure is also directed to a process for making an anti-wetting coating. The process comprises mixing ingredients comprising (a) a fluorinated polyurethane, the fluorinated polyurethane being a product of an isocyanate and a hydroxyl functionalized fluorinated polyether, (b) a copolymer of a fluoroalkylene monomer unit and dioxole monomer unit, the dioxole monomer unit being substituted with at least one of a fluorine atom or a fluoroalkyl, and (c) a solvent.

The resulting composition is deposited on a substrate to form a layer, followed by curing the layer to form the anti-wetting coating. The substrate can be any suitable substrate, such as a metal, glass or polymer substrate. Examples of suitable substrate materials include steel, aluminum and a polyimide.

The deposition method employed can be any suitable technique. Referring to FIG. 1, the reactant mixture may be applied to the aperture plate 12 using, for example, a die extrusion coating, dip coating, spray coating, spin coating, flow coating, stamp printing, and blade techniques. In an embodiment, an air atomization device such as an air brush or an automated air/liquid spray can be used to spray the reactant mixture. The air atomization device can be mounted on an automated reciprocator that moves in a uniform pattern to cover the surface of the substrate being coated with a uniform or substantially uniform amount of the reactant mixture. The use of a doctor blade is another technique that can be employed to apply the reactant mixture. In flow coating, a programmable dispenser can be used to apply the reactant mixture.

After the coating composition is applied to the aperture plate 12, the composition is heated to form the anti-wetting coating 10. During the heating, the coating composition can be dried and the layer solidifies by, for example, evaporation of solvents and/or other volatile components. The heating can be accomplished in one or more stages. For example, the coating can be heated to a temperature ranging from about 50° C. to about 350° C., such as about 100° C. to about 325° C., or about 250° C. to about 300° C. The heating can occur for any suitable length of time, such as about 10 minutes to about 3 hours, or about 20 minutes to about 2 hours, or about 30 minutes to about 1 hour. In one embodiment, the reactant mixture is first heated at a temperature of about 100° C. to about 150° C. for about 30 minutes to 2 hours, followed by a high temperature heating at about 200° C. to about 350° C. for about 30 minutes to 2 hours.

It has been observed that the anti-wetting coatings of the present disclosure have no significant amount of oil on the surface thereof following the heating step. The coatings are oleophobic. In an embodiment, a surface of the anti-wetting coatings has an ink contact angle of greater than 40 degrees. The ink used for this measurement was LancE solid ink, made by Xerox.

Printhead Including the Anti-Wetting Coating

The present disclosure is also directed to a printhead that includes the anti-witting coatings of the present disclosure. In an embodiment, the printhead comprises a jetstack. Any jetstack design can be employed and suitable example jetstacks are well known in the art. An aperture plate can be coupled to the jetstack. An anti-wetting coating can be positioned over the aperture plate either before or after the aperture plate is coupled to the jetstack. The anti-wetting coating comprises a cured blend of (a) a fluorinated polyurethane and (b) a copolymer of fluoroalkylene units and fluorine-group-substituted dioxole units. Any of the fluorinated polyurethane products described herein can be used. In an embodiment, the weight ratio of the polyurethane to the fluoroalkylene/fluoro dioxole copolymer can be within a range of from about 50:1 to about 10:1, or to about 1:1. Weight ratios outside of this range can also be employed.

An embodiment of an inkjet printhead may include an aperture plate bonded to a support brace. FIG. 1 shows an embodiment of a portion of a printhead jet stack having an anti-wetting coating. In this embodiment, anti-wetting coating 10 is coated onto an aperture plate 12. The aperture plate may be a polymer film, such as a polyimide film, bonded to an aperture support brace 14

The support brace 14 is formed of any suitable material, such as stainless steel, and include apertures 14a defined therein. The apertures 14a may communicate with an ink source (not shown). The aperture plate 12 may be formed of any suitable material such as polyimide and include apertures 12a defined therein. The apertures 12a may communicate with the ink source via the apertures 14a such that ink from the ink source is jettable from the printhead onto a recording substrate through the aperture 12a.

In the illustrated embodiment, the aperture plate 12 is bonded to the support brace 14 by an intervening adhesive material 16. The adhesive material 16 may be provided as a thermoplastic adhesive and can be melted during a bonding process to bond the aperture plate 12 to the support brace 14. Typically, the aperture plate 12 and the anti-wetting coating 10 are also heated during the bonding process. Depending on the material from which the thermoplastic adhesive is formed, example bonding temperatures range from about 150° C. and to about 350° C., or about 180° C. to about 330° C., or about 200° C. to about 300° C.

Anti-wetting coatings of the present disclosure can have one or more of the following advantages: a sufficiently low adhesion (indicated by low sliding angles) and/or high contact angle with respect to an ink after heating to bonding temperatures; ability to provide a self-cleaning and/or contamination-free inkjet printhead; or ability to provide a printhead with relatively high drool pressure; resistant to degradation of desirable surface properties (e.g., including low sliding angle and high contact angle) upon exposure to elevated temperatures.

The printheads of the present disclosure can be employed in any desired printing device. The phrase "printing device" as used herein encompasses any apparatus, such as an inkjet printer, digital copier, bookmaking machine, facsimile machine, multi-function machine, and the like, which performs a print outputting function for any purpose.

EXAMPLES

New anti-wetting coating blends were synthesized by mixing AF2400 in FC-75 solvent with Fluorolink-D formulation in Novec 7300 solvent.

The anti-wetting coating were synthesized by mixing of PART A: a fluorinated polyurethane solution, and PART B: Teflon AF2400 solution which is a copolymer of fluoroalkylene units and fluorine-group-substituted dioxole units.

Synthesis of PART A, fluorinated polyurethane: 23.4 grams of FLUOROLINK-D was added to a 3 neck round bottom flask fitted with an addition funnel, a temperature probe and a condenser. 135 mL of NOVEC 7300, 95 mL of ethyl acetate and 0.211 grams of dibutyltin dilaurate catalyst were added to the 3 neck round bottom flask, and the contents were stirred and heated to a gentle reflux (~71° C.) under a nitrogen atmosphere. A second solution was prepared by dissolving 5.04 grams of DESMODUR 3790 in 185 mL of ethyl acetate and 63 mL of NOVEC 7300. This isocyanate solution was then transferred to the addition funnel connected to the round bottom flask, and was added dropwise to the FLUOROLINK solution over a 2-hour period at 71° C. The resulting mixture was then stirred at 71° C. overnight. It was then cooled to room temperature and was filtered using a MILLIPORE OPTICAP XL filter (pore size 0.2 microns) to yield the fluorinated polyurethane solution. This solution was then diluted to 1% weight with NOVEC 7300 to yield the PART A solution.

Synthesis of PART B, TEFLON AF2400:AF2400 polymer was purchased from DuPont and was diluted with FC-75 solvent to 1% weight percent to yield the PART B solution.

The anti-wetting coating blends were synthesized by slow dropwise addition of PART B to PART A while stirring at room temperature. The contents were further stirred for 30 minutes after the addition was complete to yield the anti-wetting coating blend solution. This solution was then coated onto a polyimide substrate using a drawbar coater. The coated film was air dried for 15 minutes and then heat-cured in an oven using two sequential curing steps as follows: the air dried film was placed in an oven at 130° C. for 30 minutes (1st cure) and then at 290° C. for 30 minutes (2nd cure) to produce the anti-wetting coating.

Three coating solutions with relative weight ratios between PART B/PART A with respect to % solids were evaluated (1:1, 1:3, 1:5). Best coating quality was obtained for the PARTB/PARTA ratio of 1:5.

The AF2400/FLUOROLINK-D 1:5 ratio coating was cured at 130° C. for 30 min and then at 290° C. for an additional 30 min. Presence of oil was checked visually and under a microscope. No oil was observed on the coating after the cure at 290° C.

Characterization of the Oleophobic AF2400/FLUOROLINK-D Coating:

Coatings were evaluated for film quality and surface properties towards inks as described next.

Contact angle and sliding angle of the coatings were determined on an OCA20 goniometer from Dataphysics. In a typical static contact angle measurement, about 10 microliter of hexadecane or about 10 microliter of solid ink (at typical ink jetting temperature of 115° C. or 90° C. respectively) is gently deposited on the surface of the coating and the static angle is determined by the computer software (SCA20). Each reported data is an average of >5 independent measurements. Sliding angle measurement are done by tilting the base unit at a rate of 1°/sec with an about 10 microliter droplet of hexadecane or solid ink. The sliding angle is defined as the inclination angle at which the test drops begin to slide.

An offline test, so called stacking, was used to simulate adhesive bonding during printhead fabrication. Typically the coating was subjected to a high pressure and high temperature stress, e.g., at 290° C. at 350 psi for 30 min and the contact angle and sliding angle afterward were measured.

Ink aging experiment was designed as an accelerated test to simulate the functional life of the coating. The experiment was performed by immersing the coating after stacking in a molten solid ink (equal parts of cyan, magenta, yellow and black ink) at 140° C. for 2 days. The contact angle and sliding angle with solid ink after ink aging were determined as described before.

The quality of the coating surface was inspected for the presence of trace amount of oil by gently rubbing the surface with a Q-tip and visually observing for smudge marks. The presence of smudge marks indicates the presence of oil on the coating surface.

The results for coatings are summarized in Table 1 residue. In addition, this exemplary oleophobic grafted polymer is expected to have the mechanical robustness desired for the long term performance of these coatings.

The fact that these coatings show no oil and have very high thermal stability while maintaining the desired surface properties makes them attractive options for anti-wetting coatings for high definition piezo print applications.

Ink Soak Studies:

For this test, approximately 1 in.×3 in. coupons of the coating were immersed in Xerox LancE solid ink for up to 2 days at 140° C. After that duration, the coupons were pulled out from the ink and their surface was examined for any sticking ink residue or defects. A clean surface indicated that the coatings were robust and inert towards ink. The results of the study showed that when the coupons were pulled from ink soak studies, the ink came cleanly off and no significant ink residue was observed on the coatings. This suggests that ink may be wiped off cleanly by a wiper blade during printhead ("PH") maintenance cycles.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are

TABLE 1

| Coating | Contact Angle (Sliding Angle) With hexadecane | | | Contact Angle (Sliding Angle) With Xerox LancE solid ink | | | |
|---|---|---|---|---|---|---|---|
| | Initial (after curing) | Stacking 290° C./350 psi/30 min | Stacking + 2 day Inking at 140° C. | Initial (after curing) | Stacking 290° C./ 350psi/ 30 min | Stacking + 2 day Inking at 140° C. | Oil Presence |
| AF2400/ FLUOR OLINK-D coatings | 64° (12°- 15°) | 69° (25°- 27°) | 69° (28°- 30°) | 69° (21°- 25°) | 74° (30°- 32°) | 71° (30°- 33°) | No oil |
| Control Coating | 65° (7°- 11°) | 63° (13°- 15°) | N.A | 71° (10°) | 68° (15°) | 60° (20°) | Oil present |

As can be seen, the surface properties are comparable to the current control coating. These coatings maintained high contact angles after stacking conditions (290° C./350 PSI with Teflon overlay) which simulates press adhesive bonding cycles employed during printhead fabrication. Also stacked coatings maintained high contact angle after 2 days at 140° C. with molten CYMK ink. The sliding angles were somewhat higher than a control, but the ink slid cleanly from the surface and it is believed to be sufficiently low to enable easy cleaning in use. After the ink aging, the ink drops still slid over the coating surface without deforming or leaving a significant used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A composition made from ingredients comprising:
a fluorinated polyurethane, the fluorinated polyurethane being a product of an isocyanate and a hydroxyl functionalized fluorinated polyether; and
a copolymer of (i) a fluoroalkylene monomer unit and (ii) a dioxole monomer unit substituted with at least one substituent selected from the group consisting of a fluorine atom and a fluoroalkyl.

2. The composition of claim 1, wherein the isocyanate is a monomer of formula 1 or polymer formed from two or more monomers of formula 1:

wherein $R^1$ is selected from the group consisting of an alkyl group, an alkylene group, an aryl group, an arylene group, an arylalkyl group, an arylalkylene group, an alkylaryl group and an alkylarylene group, wherein the $R^1$ group optionally contains one or more heteroatoms; and where n is an integer ranging from 1 to 3.

3. The composition of claim 2, wherein $R^1$ has at least 8 carbon atoms is selected from the group consisting of substituted or unsubstituted alkyl and substituted or unsubstituted alkylene.

4. The composition of claim 2, wherein $R^1$ has at least 5 carbon atoms and is selected from the group consisting of a substituted or unsubstituted aryl and a substituted or unsubstituted arylene.

5. The composition of claim 2, wherein $R^1$ has at least 6 carbon atoms and is selected from the group consisting of a substituted or unsubstituted arylalkyl and a substituted or unsubstituted arylalkylene.

6. The composition of claim 1, wherein the isocyanate is a diisocyanate selected from the group consisting of isophorone diisocyanate (IPDI); 2,4-toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; 2,2,4-trimethylhexamethylene diisocyanate; 2,4,4-trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate; cyclohexylene diisocyanate and its isomers; and uretidione dimers of HDI.

7. The composition of claim 1, wherein the isocyanate is a triisocyanate selected from the group consisting of triphenyl methane-4,4',4''-triisocyanate; Tris(p-isocynatophenyl)thiophosphate; trimethylolpropane trimer of TDI; isocyanurate trimers of TDI, HDI, IPDI; and biuret trimers of TDI, HDI, IPDI.

8. The composition of claim 1, wherein the hydroxyl functionalized fluorinated polyether is a compound of formula 2:

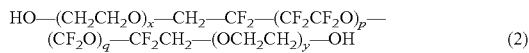

wherein p and q are integers ranging from 0 to about 50; and x and y are integers ranging from 0 to about 10, with the proviso that at least one of p and q are not zero.

9. The composition of claim 1, wherein the fluoroalkylene is tetrafluoroethylene and the dioxole is 4,5-difluoro-2,2-bis(trifluoromethyl)-1,3-dioxole.

10. A process comprising:
mixing ingredients to form a composition, the ingredients comprising (a) a fluorinated polyurethane, the fluorinated polyurethane being a product of an isocyanate and a hydroxyl functionalized fluorinated polyether, (b) a copolymer of a fluoroalkylene monomer unit and dioxole monomer unit, the dioxole monomer unit being substituted with at least one of a fluorine atom or a fluoroalkyl, and (c) a solvent;
depositing the composition on a substrate to form a layer; and
heating the layer to form an anti-wetting coating.

11. The process of claim 10, further comprising reacting the isocyanate and the hydroxyl functionalized fluorinated polyether to form the fluorinated polyurethane prior to mixing with the copolymer of fluoroalkylene monomer units and dioxole monomer units.

12. The process of claim 10, wherein the hydroxyl functionalized fluorinated polyether is a compound of formula 2:

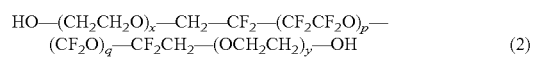

wherein p and q are integers ranging from 0 to about 50; and x and y are integers ranging from 0 to about 10, with the proviso that at least one of p and q are not zero.

13. The process of claim 10, wherein the fluoroalkylene is tetrafluoroethylene and the dioxole is 4,5-difluoro-2,2-bis(trifluoromethyl)-1,3-dioxole.

14. The process of claim 10, wherein the weight ratio of the polyurethane to the copolymer ranges from about 1:3 to about 1:20.

15. The process of claim 10, wherein the heating comprises increasing a temperature of the layer to range from about 250° C. to about 350° C. for a time ranging from about 10 minutes to about 60 minutes.

16. An oleophobic anti-wetting coating made by the process of claim 10, a surface of the anti-wetting coating having no significant amount of oil following the curing step.

17. An oleophobic anti-wetting coating made by the process of claim 10, the anti-wetting coating having a surface capable of maintaining a contact angle of greater than about 40° with a drop of solid ink after the coating has been exposed to a temperature of 290° C. and a pressure of 350 psi for 30 minutes.

18. A printhead comprising:
a jetstack;
an aperture plate positioned on the jetstack; and
an anti-wetting coating positioned over the aperture plate, the anti-wetting coating comprising a reacted blend of (a) a fluorinated polyurethane, the fluorinated polyurethane being a product of an isocyanate and a hydroxyl functionalized fluorinated polyether, and (b) a copolymer of fluoroalkylene monomer units and fluorine-group-substituted dioxole units, wherein
wherein the anti-wetting coating has a surface capable of maintaining a contact angle of greater than about 40° with a drop of solid ink after the coating has been exposed to a temperature of 290° C. and a pressure of 350 psi for 30 minutes.

19. The printhead of claim 18, wherein the aperture plate comprises polyimide.

20. The printhead of claim 18, wherein the aperture of the printhead is in fluid connection with a reservoir of ink, the ink being selected from the group consisting of solid ink, pigmented ink and UV ink.

\* \* \* \* \*